United States Patent
Oaks et al.

[11] 3,752,515
[45] Aug. 14, 1973

[54] RESILIENT KEEPER RING

[75] Inventors: Seibert S. Oaks, Everett; Ethamore F. Claar, Imler, both of Pa.

[73] Assignee: Kennametal Inc., Latrobe, Pa.

[22] Filed: Sept. 15, 1971

[21] Appl. No.: 180,710

[52] U.S. Cl. .................................. 287/52 R, 85/8.8
[51] Int. Cl. ............................................. F16d 1/06
[58] Field of Search ................. 299/86; 299/92, 86; 85/8.8; 287/DIG. 7, 52; 151/36; 277/222

[56] References Cited
UNITED STATES PATENTS
3,512,838  5/1970  Kniff .................................. 299/92 X
1,709,933  4/1929  Cowan .............................. 151/36 X
2,867,824  1/1959  O'Connor ......................... 151/36 X
3,152,375  10/1964  Blakeley ........................... 85/64 UX FOREIGN PATENTS OR APPLICATIONS
207,706  9/1966  Sweden .............................. 277/222

Primary Examiner—Andrew V. Kundrat
Attorney—Melvin A. Crosby

[57] ABSTRACT

The specification discloses a resilient keeper ring, especially for mounting in the grooved shank of a rotatable tool for retaining the tool in a support block therefor in which the resilient ring is in the form of a split band with the ends of the band in overlapping relation so that the bands can be handled in an automatic feeding device without becoming interlocked with each other.

3 Claims, 7 Drawing Figures

PATENTED AUG 14 1973 3,752,515
FIG-1
FIG-2
FIG-3
FIG-4
FIG-5
FIG-6
FIG-7
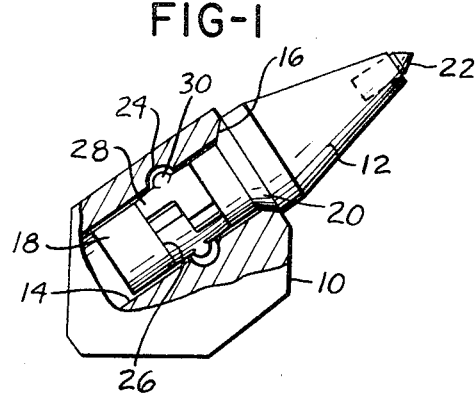
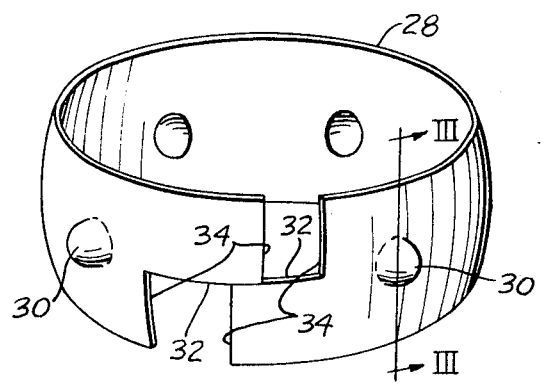
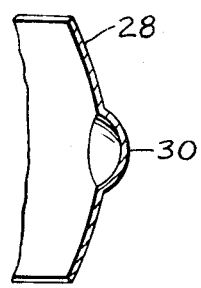
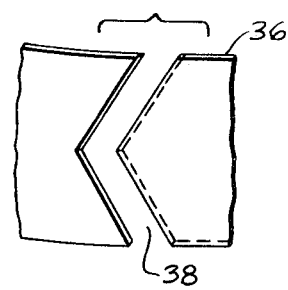
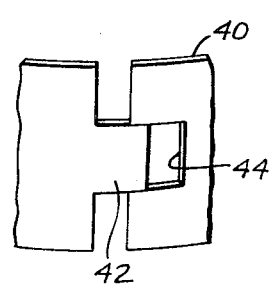
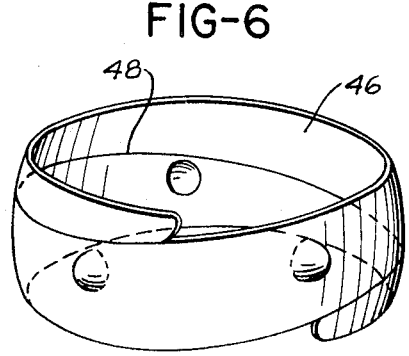
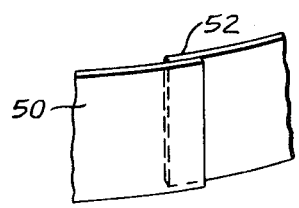

RESILIENT KEEPER RING

The present invention relates to resilient keeper rings and is particularly concerned with split resilient keeper rings for mounting in grooves on the shanks of tools for detachably retaining the tools in support blocks therefor.

Resilient retaining rings of the nature with which the present invention is concerned are employed, in particular, in connection with pick type mining tools or bits which are adapted for being rotatably and detachably supported in a support block. Such bits or tools are manufactured in large quantities and, as a matter of economy, the assembling of the split keeper rings on the shanks of the tools is performed automatically, with the keeper rings being fed from a feeder and automatically mounted on the tool shanks.

Heretofore, the keeper rings have been in the form of a simple split band with the ends of the split band in spaced opposed relation. Such a resilient keeper ring is quite satisfactory for retaining the tool on which it is mounted in the support block but introduces the problem that feeding of the rings from a supply thereof can be interferred with by the keeper rings hooking together.

With the foregoing in mind, the primary objective of the present invention is the provision of a split keeper ring which retains full resilience for contraction and expansion thereof while being so constructed as to prevent the rings from locking together when fed from a feeder, for example, a vibratory feeder.

A further object is the provision of a resilient keeper ring construction which will not become interlocked with other keeper ring constructions when placed together therewith in bulk while at the same time not appreciably increasing the cost of the keeper ring or in any way interferring with the operation thereof.

The foregoing objects as well as other objects of the present invention will become more apparent upon reference to the following detailed specification taken in connection with the accompanying drawings in which:

FIG. 1 somewhat schematically illustrates a pick type mining tool in a support block therefor with a resilient keeper ring according to the present invention mounted on the shank of the tool;

FIG. 2 is a perspective view drawn at enlarged scale showing more in detail the preferred form of the keeper ring;

FIG. 3 is a vertical section indicated by line III—III on FIG. 2 showing the cross sectional shape of the ring;

FIG. 4 is a fragmentary view showing another manner in which the ring can be formed so as not to interlock with others thereof;

FIG. 5 is a view like FIG. 4 showing a still further modification;

FIG. 6 is a perspective view like FIG. 2 but shows a resilient keeper ring with a helical incision formed therein; and FIG. 7 is a fragmentary view like FIGS. 4 and 5 showing still another arrangement for closing the gap between the ends of the keeper ring.

BRIEF SUMMARY OF THE INVENTION

A resilient keeper ring according to the present invention is formed of a resilient metal which is shaped to define a band with the ends of the band moveable relatively of the circumferential direction of the ring so that the ring can expand or contract.

Preferably, the ring has one or more radial protuberances formed thereon for engaging a groove in the support member for the tool on which the ring is mounted, but there are occasions when the protuberances are not required as, for example, when the ring is used merely as a friction element, or where the frictional configuration of the ring is such that it will engage a groove in the support member.

The opposed ends of the resilient keeper ring according to the present invention are overlapping in at least one of the radial and axial directions of the ring so that there is not a straight continuous gap between the opposed ends of the ring which would permit the rings to hook together when fed from a bulk supply thereof.

In one form of the invention, the opposed ends of the ring are formed in steps so that the circumferential portions of the steps can rest in sliding engagement.

In another form of the invention, the space between the opposed ends of the rings is other than linear, for example, zig-zag, so that no straight open gap exists between the opposed ends of the ring.

In still another form, the incision which separates the opposed ends of the rings extends helically about the ring thereby effectively closing the gap between the opposed ends of the rings.

DETAILED DESCRIPTION OF THE INVENTION

Referring to the drawings somewhat more in detail, in FIG. 1, 10 is a support block for a pick type bit or tool 12. Block 10 is adapted for being welded or otherwise suitably affixed to a driving device such as a disc or chain or other mining machine device for driving tool 12 against a formation to be reduced.

Block 10 has a bore 14 therein with a tapered mouth 16. Tool 12 has a cylindrical shank 18 receivable in bore 14 and has a tapered seat portion 20 adapted for engaging seat 16 at the mouth of bore 14. The end of tool 12 projecting outwardly from block 10 tapers inwardly to a point and at the said point there is mounted a hard wear resistant point element 22 formed of, for example, cemented tungsten carbide.

In bore 14, there is provided a groove 24 and mounted on shank 18 in a groove 26 provided therefor is a split resilient keeper ring 28 having protuberances 30 engageable with groove 24. Keeper ring 28 is so formed relative to groove 26 that the keeper ring can be readily compressed to within the envelope of bore 14 so that the tool can be inserted in and removed from bore 14 while the resilience of the keeper ring permits the protuberances 30 to engage groove 24 to hold the tool in bore 14 of support block 10. Further, resilient keeper ring 28 is freely rotatable relative to at least one of block 10 and tool 12 so that tool 12 is freely rotatable in block 10.

The keeper ring 28 is illustrated more in detail in FIGS. 2 and 3. The keeper ring comprises a band of metal, concave toward the center of the ring, as will be seen in FIGS. 2 and 3, while the protuberances 30 are distributed circumferentially of the ring.

A particular feature of the keeper ring is that the opposed ends are formed with coplanar circumferential regions 32 in sliding engagement with each other with axial regions 34 at opposite ends of the circumferential region and in spaced relation so that the ring can expand and contract. The arrangement is such that the opposed ends of the ring are effectively separated and are moveable circumferentially of the ring to permit expansion and contraction of the ring while, at the same time, the rings are prevented from hooking together with each other and can thus reliably be fed from a bulk supply thereof as by a vibratory feeder.

In FIG. 4, split ring 36 has the incision defining the opposed ends thereof and in zig-zag form is indicated at 38 and this also prevents rings from hooking together when fed from a bulk supply thereof. The incision at 38, while shown as a simple "V" configuration, could have other configurations, such as curved or the like, the important thing being that two rings will not become hooked together.

In FIG. 5, one end of the split ring 40 has a central circumferential projection 42 and the other end has a central circumferential notch 44 into which projection 42 extends. This arrangement also effectively prevents rings from becoming hooked together when fed from a bulk supply thereof.

In FIG. 6, ring 46 has a helical incision 48 therein which permits expansion and contraction of the ring with which it effectively eliminates any gap between the opposed ends of the ring which would permit the rings to become linked together.

In FIG. 7, ring 50 has the opposed ends thereof overlapping in the circumferential direction of the ring as indicated at 52, and this also prevents rings from becoming hooked together when fed from a bulk supply thereof.

In all of the modifications illustrated and described, the efficiency of the ring is unimpaired in that it can resiliently contract and expand, but the significant advantage exists that the rings will not become hooked together when thrown together in bulk supply and particularly when fed therefrom as by a vibratory feeder.

Modifications may be made within the scope of the appended claims.

What is claimed is:

1. A resilient ring for use as a captive keeper on the shank of a tool for retaining the tool in assembled relation with a support block therefor comprising a band of thin resilient metal of uniform thickness formed to a substantially cylindrical configuration and concave toward the center in axial cross section, said ring being split axially from end to end so as to be radially expansible and contractable, the opposed circumferential ends of said ring on opposite sides of the split in the ring overlapping in the circumferential direction whereby a plurality of the rings in bulk condition are prevented from becoming hooked together, said ring between the axial ends thereof protruding radially outwardly further than the said axial ends.

2. A resilient ring according to claim 1 in which each of the opposed circumferential ends of the ring is formed with at least two axially and circumferentially spaced axial end regions which face in the circumferential direction and at least one circumferential region which faces in the axial direction and extending between said axial regions, the circumferential regions of said opposed circumferential ends facing in respectively opposite axial directions and being in slidable engagement with each other while the said axial regions of said opposed circumferential ends are disposed in circumferentially spaced relation in relaxed condition of said ring.

3. A resilient ring according to claim 1 in which said ring comprises rounded protrusions projecting radially outwardly therefrom in circumferentially spaced relation in about the axially central region of the ring.

* * * * *